(12) United States Patent
Fey et al.

(10) Patent No.: US 11,667,082 B2
(45) Date of Patent: Jun. 6, 2023

(54) APPARATUS AND METHOD FOR MANUFACTURING A THREE-DIMENSIONAL OBJECT

(71) Applicant: EOS GmbH Electro Optical Systems, Krailling (DE)

(72) Inventors: Georg Fey, Munich (DE); Martin Heugel, Landsberg am Lech (DE); Sebastian Friedel, Munich (DE); Dominik Wolf, Munich (DE); Alexander Schilling, Wildpoldsried (DE); Philip Ströbel, Weidenbach (DE)

(73) Assignee: EOS GmbH Electro Optical Systems, Krailling (DE)

( * ) Notice: Subject to any disclaimer, the term of this patent is extended or adjusted under 35 U.S.C. 154(b) by 62 days.

(21) Appl. No.: 16/073,878

(22) PCT Filed: Jan. 31, 2017

(86) PCT No.: PCT/EP2017/052016
§ 371 (c)(1),
(2) Date: Jul. 30, 2018

(87) PCT Pub. No.: WO2017/134044
PCT Pub. Date: Aug. 10, 2017

(65) Prior Publication Data
US 2019/0039313 A1    Feb. 7, 2019

(30) Foreign Application Priority Data

Feb. 5, 2016  (DE) .......................... 102016201812.4

(51) Int. Cl.
*B29C 64/371*  (2017.01)
*B33Y 30/00*  (2015.01)
(Continued)

(52) U.S. Cl.
CPC ............ *B29C 64/371* (2017.08); *B22F 10/28* (2021.01); *B22F 10/32* (2021.01); *B22F 10/322* (2021.01);
(Continued)

(58) Field of Classification Search
CPC ......... B33Y 10/00; B33Y 40/00; B33Y 30/00; B33Y 50/02; B29C 64/371; B29C 64/393;
(Continued)

(56) References Cited

U.S. PATENT DOCUMENTS

| | | |
|---|---|---|
| 5,527,019 A | 6/1996 | Schwarz |
| 5,730,925 A | 3/1998 | Mattes et al. |

(Continued)

FOREIGN PATENT DOCUMENTS

| | | |
|---|---|---|
| DE | 4130640 | 3/1993 |
| DE | 19514740 | 4/1996 |

(Continued)

OTHER PUBLICATIONS

Asco's brochure regarding Posiflow® Valves (available at https://www.asconumatics.eu/images/site/upload/_en/pdf1/00009gb.pdf, a google search page is provided as a proof of the publication date on May 30, 2008) (Year: 2008).*

(Continued)

*Primary Examiner* — Xiao S Zhao
*Assistant Examiner* — Inja Song
(74) *Attorney, Agent, or Firm* — Seyfarth Shaw LLP (57) ABSTRACT

An apparatus for manufacturing a three-dimensional object by a layer-by-layer solidification of building material at the points corresponding to the cross-section of the object to be manufactured in a respective layer. The apparatus includes a process chamber in which the object is to be built up layer by layer by selectively solidifying layers of a building (Continued)

material in a build area, a gas supply device, and a recirculating air filter device, wherein the apparatus comprises a pressure stabilization device configured to keep the pressure in the process chamber substantially constant.

20 Claims, 5 Drawing Sheets

(51) Int. Cl.
```
B29C 64/153    (2017.01)
B29C 64/20     (2017.01)
B33Y 10/00     (2015.01)
B33Y 50/02     (2015.01)
B33Y 40/00     (2020.01)
B22F 10/28     (2021.01)
B22F 10/77     (2021.01)
B22F 12/67     (2021.01)
B22F 12/70     (2021.01)
B22F 10/32     (2021.01)
B22F 10/322    (2021.01)
B29C 64/393    (2017.01)
B22F 12/90     (2021.01)
```

(52) U.S. Cl.
CPC .............. *B22F 10/77* (2021.01); *B22F 12/67* (2021.01); *B22F 12/70* (2021.01); *B29C 64/153* (2017.08); *B29C 64/20* (2017.08); *B29C 64/393* (2017.08); *B33Y 10/00* (2014.12); *B33Y 30/00* (2014.12); *B33Y 40/00* (2014.12); *B33Y 50/02* (2014.12); *B22F 12/90* (2021.01); *Y02P 10/25* (2015.11)

(58) Field of Classification Search
CPC ..... B29C 64/153; B29C 64/20; B22F 3/1055; B22F 2003/1059; B22F 2003/1056; B22F 2003/1057; B22F 10/70; B22F 12/00; Y02P 10/25

See application file for complete search history.

(56) References Cited

U.S. PATENT DOCUMENTS

| | | | |
|---|---|---|---|
| 6,583,379 B1 | 6/2003 | Meiners et al. | |
| 2004/0004303 A1* | 1/2004 | Iskra | B33Y 50/00 264/109 |
| 2005/0116391 A1 | 6/2005 | Lindemann et al. | |
| 2007/0001342 A1 | 1/2007 | Oberhofer et al. | |
| 2010/0071555 A1* | 3/2010 | Jankkila | B01D 46/48 95/279 |
| 2011/0233808 A1* | 9/2011 | Davidson | B29C 64/35 425/456 |
| 2011/0291331 A1* | 12/2011 | Scott | B33Y 30/00 264/510 |
| 2014/0140882 A1* | 5/2014 | Syassen | B22F 10/20 219/121.64 |
| 2018/0133956 A1* | 5/2018 | Buller | B23K 26/354 |
| 2018/0244034 A1* | 8/2018 | Sutcliffe | B29C 64/20 |
| 2019/0022946 A1* | 1/2019 | Jones | B33Y 50/02 |

FOREIGN PATENT DOCUMENTS

| | | | |
|---|---|---|---|
| DE | 19853947 | 2/2000 | |
| DE | 19937260 | 2/2001 | |
| DE | 102010026139 | 1/2012 | |
| DE | 102012004587 | 9/2013 | |
| DE | 102014207160 | 10/2015 | |
| DE | 102014207160 A1 * | 10/2015 | ......... B01D 46/0068 |
| EP | 1514622 | 3/2005 | |
| EP | 2730353 | 5/2014 | |
| EP | 2774703 | 9/2014 | |
| EP | 3221073 | 4/2020 | |
| WO | 2004005014 | 1/2004 | |
| WO | 2014199150 | 12/2014 | |
| WO | 2016079494 | 5/2016 | |

OTHER PUBLICATIONS

English translation of DE-102014207160-A1 by EPO. (Year: 2015).*
International Search Report for Application No. PCT/EP2017/052016 dated Jul. 12, 2017, 6 pages.
DE Office Action for Application No. 102016201812.4, dated Jan. 16, 2017, 7 pages.
SLM Solutions GmbH, "Betriebsanleitung SLM 125 HL (Auszug)", 2015, 21 pages.
Gieseke, Matthias, "Entwicklung des selektiven Laserstrahlschmelzens von Magnesium und Magnesiumlegierungen zur Herstellung von individuellen und bioresorbierbaren Implantaten", 2015, 11 pages.

* cited by examiner

Fig. 1 fig. 4

APPARATUS AND METHOD FOR MANUFACTURING A THREE-DIMENSIONAL OBJECT

TECHNICAL FIELD OF THE INVENTION

The present invention relates to an apparatus and a method for manufacturing a three-dimensional object by a layer-by-layer application and selective solidification of a building material. Apparatuses and methods of this type are, for instance, used in Rapid Prototyping, Rapid Tooling, and Additive Manufacturing. An example of such a method is known as "selective laser sintering" or "selective laser melting". In the course of this, a thin layer of a building material in powder form is repeatedly applied to a build area, and the building material in each layer is selectively solidified by selectively irradiating it using a laser beam, i.e. the building material is partially or completely melted at these points and solidifies thus forming a material bond.

BACKGROUND OF THE INVENTION

Document DE 195 14 740 C1 describes a method of manufacturing a three-dimensional object by means of a selective laser sintering or a selective laser melting as well as an apparatus for performing this method.

When solidifying building material, so-called splashes are generated depending on the kind of the material used, in particular when sintering or melting metal powder. When splashes are generated, material is ripped out of the point being partially or completely melted. Also smoke, condensates, and/or other substances, are released at the point of solidification. Generated splashes, smoke, and condensates as well as other released substances can lead to contaminations of the apparatus. Furthermore, generated splashes, smoke, and condensates as well as other released substances lead to a partial absorption and/or partial scattering and, thus, to a partial loss of the radiation directed to the building material for its selective solidification. In order to remove such impurities from the process chamber, document DE 198 53 947 C1 proposes a process chamber in whose two opposite ends an opening for the protective gas inlet and an opening for the protective gas outlet are arranged, by means of which a directed protective gas stream through the process chamber is generated.

In order to save protective gas, normally, a so-called recirculating air filter device is used in which the protective gas coming from the process chamber is cleaned in a filter device and the filtered protective gas is supplied to the process chamber again. Such a recirculating air filter device is, thus, distinguished by a closed gas circuit. In this context, "recirculating air" does not mean that air circulates in the system, but is generally used for any system having a closed gas circuit.

During operation, a filter element of the recirculating air filter device becomes soiled since the substances to be filtered from the gas deposit at the filter element. From time to time, a filter element of the recirculating air filter device needs to be cleaned. An apparatus for manufacturing a three-dimensional object by a layer-by-layer application and selective solidification of building material in which a filter element of a recirculating air filter device can be cleaned by means of a shock pressure is known from document DE 10 2014 207 160 A1.

The flow resistance of a filter element changes when the substances to be filtered from the gas deposit at the filter element: the flow resistance rises with increasing contamination of the filter element. The flow resistance of a filter element also changes as a consequence of its cleaning, it is lower after the cleaning than in the new condition of the filter element.

With the known apparatuses for manufacturing a three-dimensional object by a layer-by-layer application and selective solidification of building material possessing a recirculating air filter device, it is disadvantageous that (partially abrupt) changes of the pressure in the process chamber result from the change of the flow resistance in the recirculating air filter device. As a consequence of the changes of the pressure in the process chamber, constructional elements of the apparatus can change their shape and/or relative position with respect to each other. The deforming constructional elements typically elastically deform at typically occurring pressure changes. Due to deformation of constructional elements, inaccuracy in the dimensions of the object to be manufactured, i.e. adverse effects on the dimensional accuracy of an object to be manufactured, as well as disturbances of the process of manufacturing an object occur.

SUMMARY OF THE INVENTION

An object of the invention consists in providing an improved apparatus and an improved method for manufacturing a three-dimensional object by a layer-by-layer application and selective solidification of a building material.

The object is achieved by an apparatus according to claim 1 and a method according to claim 15. Further developments of the invention are respectively provided in the dependent claims, wherein the features mentioned in the dependent claims directed to the apparatus may also be understood as a further development of the method.

The apparatus according to the invention and the method according to the invention make it, inter alia, possible to manufacture a three-dimensional object with high accuracy. It is, in particular, achieved by the invention that the base plate whereon the object is to be built up or, respectively, whereon a building platform is arranged on which the object is to be built up and the recoater for applying the building material can be positioned in a vertical direction more accurately. Thereby, for instance, the thickness of the applied layers is more accurately controllable, which is a precondition for that the dimensions of a manufactured object precisely coincide with the desired dimensions. Thereby, for instance, the manufacturing of filigree objects further becomes possible.

The apparatus according to the invention is an apparatus for manufacturing a three-dimensional object by a layer-by-layer solidification of building material at the points corresponding to the cross-section of the object to be manufactured in a respective layer. The apparatus comprises a process chamber in which the object is to be built up layer by layer by selectively solidifying layers of a building material in a build area. The apparatus comprises a gas supply device. The apparatus comprises a recirculating air filter device. The apparatus comprises a pressure stabilization device configured to keep the pressure, i.e. a desired (process chamber) operating pressure, in the process chamber substantially constant. Thereby, for instance, the dimensional accuracy of an object to be manufactured is improved.

Preferably, the recirculating air filter device of the apparatus according to the invention comprises at least one filter device and a pump device. Thereby, for instance, a simple modular setup of the apparatus according to the invention can be achieved.

Preferably, a filter device of the recirculating air filter device of the apparatus according to the invention is cleanable, in particular cleanable by a gas pressure shock opposing the gas flow direction. Thereby, for instance, a rapid and thorough cleaning of the filter device is possible.

Actually, in particular, cleaning a filter by a shock pressure resulted in significant pressure variations in the process chamber up to now, which can be prevented by means of the invention.

Preferably, the apparatus according to the invention comprises a solidification device for solidifying building material in the respective layer at positions in the build area which correspond to the cross-section of the object, which solidification device comprises an irradiation device for emitting electromagnetic radiation, in particular laser radiation, and/or for emitting particle radiation to positions in the build area which correspond to the cross-section of the object in the respective layer of the building material. Thereby, for instance, an apparatus for a selective laser sintering or selective laser melting is provided.

Preferably, the apparatus according to the invention comprises a recoating device configured to apply a layer of the building material, in particular building material in powder form, to the build area. Thereby, for instance, an apparatus for manufacturing an object based on powder material is provided. In particular, the distance between such a recoating device and a build area is actually changed as a consequence of a pressure change, which can lead to an imprecision of the thickness of a layer of the building material to be applied.

Preferably, the pressure stabilization device of the apparatus according to the invention comprises a gas supply adjustment device for varying the amount of gas streaming into the process chamber from the gas supply device per unit of time. Thereby, for instance, the amount of gas streaming into the process chamber from the gas supply device per unit of time can be purposefully dosed. Besides, such a gas supply adjustment device can contribute to a sole (or combined) pressure regulation. Further, it is also possible to provide a concentration of a particular substance within the gas (e.g. an oxygen concentration in a gas mixture) in a defined and controlled manner by means of such a gas supply adjustment device.

Preferably, the pressure stabilization device of the apparatus according to the invention comprises a gas outlet adjustment device for varying the amount of gas streaming out of the apparatus through a gas outlet per unit of time. Thereby, for instance, the pressure in the process chamber can be kept substantially constant in a simple manner. The use of a gas supply adjustment device and the use of a gas outlet adjustment device can also be combined with each other, so that a pressure stabilization coordinated between these two mentioned adjustment devices can be performed. Thereby, for instance, the gas outlet adjustment device can then fulfill a kind of safety function in order to limit a pressure in the process chamber such that it does not exceed a predetermined threshold.

Preferably, a gas outlet is mounted at the process chamber of the apparatus according to the invention. Thereby it is, for instance, possible to adjust the pressure in the process chamber rapidly and precisely.

Preferably, the apparatus according to the invention comprises a gas outlet arranged behind the filter device in the flow direction of the gas through the recirculating air filter device. Thereby it is, for instance, ensured that gas discharged from the apparatus does not comprise a contamination by solid or liquid substances. In the course of this, it is then also possible to guide the respective gas at a relatively low pressure (practically reaching to atmospheric pressure) through the outlet, whereas the gas in the process chamber can be under a higher pressure.

Such a higher pressure prevents, inter alia, also an undesired entry of air (or other ambient gases) into the process chamber.

Preferably, the pressure stabilization device of the apparatus according to the invention comprises a gas flow rate adjustment device associated with the recirculating air filter device and having a variable flow resistance. Thereby it is, for instance, possible to keep the flow resistance of the recirculating air filter device substantially constant and to operate the pump device at a substantially constant power.

Preferably, the gas flow rate adjustment device associated with the recirculating air filter device of the apparatus according to the invention is arranged in front of the pump device, in particular behind the filter device (or, respectively, behind at least one filter element of the filter device), in flow direction of the gas. Thereby, for instance, no gas contaminated with solid or liquid substances gets into the pump device.

Preferably, the apparatus according to the invention comprises a pressure measuring device for measuring the pressure in the process chamber. Thereby, for instance, the possibility of controlling the pressure in the process chamber is created, whereby it becomes possible to keep the pressure inside the process chamber substantially constant at low gas consumption.

Preferably, the apparatus according to the invention comprises a control device configured to vary the amount of gas streaming into the process chamber from the gas supply device per unit of time and/or the amount of gas streaming out of the apparatus per unit of time and/or the flow resistance of the gas flow rate adjustment device by means of the pressure stabilization device such that the pressure in the process chamber is substantially constant. Thereby, for instance, a control device is provided which is able of controlling an apparatus for manufacturing a three-dimensional object such that it automatically performs the method according to the invention.

Preferably, the pressure stabilization device of the apparatus according to the invention is configured such as to vary the pressure in the process chamber within not more than 10 seconds after the cleaning of the filter device such that it has substantially the same value as before the cleaning. Thereby, for instance, no longer breaks emerge during the manufacturing of a three-dimensional object.

The method according to the invention is a method of manufacturing a three-dimensional object by a layer-by-layer solidification of building material at the points corresponding to the cross-section of the object to be manufactured in a respective layer. The method is performed in an apparatus comprising a process chamber in which the object is built up layer by layer by selectively solidifying layers of a building material in a build area, a gas supply device, a recirculating air filter device, and a pressure stabilization device. The pressure stabilization device keeps the pressure in the process chamber substantially constant. Thereby, for instance, the dimensional accuracy of an object to be manufactured is improved.

BRIEF DESCRIPTION OF THE DRAWINGS

Further features and the usefulness of the invention will arise from the description of examples of embodiments of the apparatus according to the invention and the method according to the invention with reference to the accompanying drawings.

DETAILED DESCRIPTION OF THE EMBODIMENTS

Figure 1:
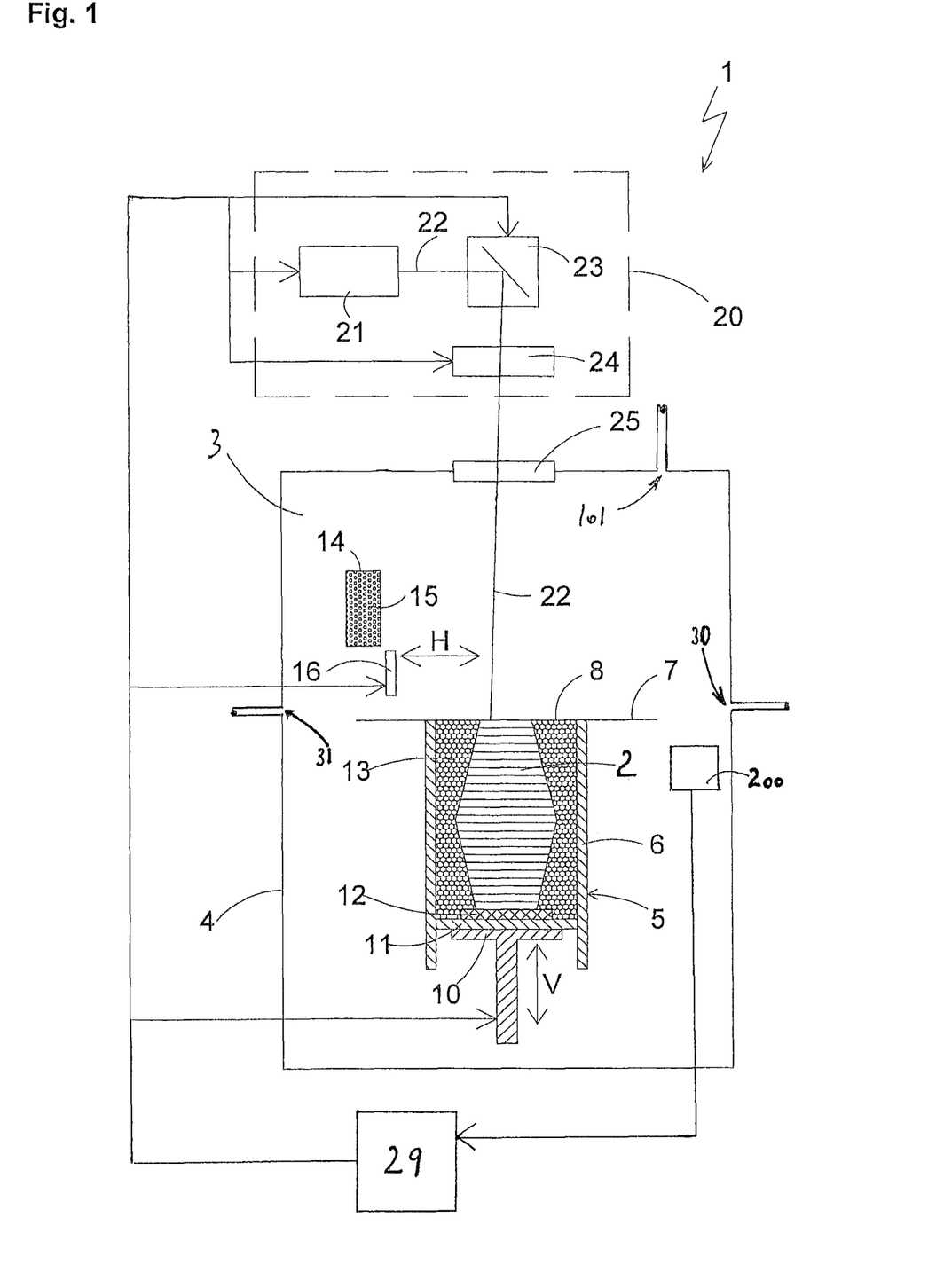
FIG. 1 is a schematic cross-sectional basic view of an embodiment of an apparatus according to the invention for a layer-by-layer manufacturing of a three-dimensional object.

The apparatus shown in FIG. 1 is a laser sintering or laser melting apparatus 1 for manufacturing an object 2. The associated gas supply device 100 and the associated recirculating air filter device 32 are not depicted in FIG. 1 for clarity reasons (cf. the following Figures).

The laser sintering or laser melting apparatus 1 contains a process chamber 3 having a chamber wall 4. In the process chamber 3, a container 5 open to the top and having a wall 6 is arranged. In the container 5, a support 10 movable in a vertical direction V is arranged at which a base plate 11 is mounted which closes the container 5 in a downward direction and thereby forms its bottom. The base plate 11 may be a plate formed separately from the support 10, which is attached to the support 10, or it may be integrally formed with the support 10. Depending on a powder used and a process, a building platform 12 on which the object 2 is built up may further be mounted on the base plate 11. However, the object 2 may also be built up on the base plate 11 itself, which then serves as a building platform.

In FIG. 1, the object 2 to be built in the container 5 on the building platform 12 is shown below a working plane 7 in an intermediate state. It consists of several solidified layers and is surrounded by building material 13 remaining non-solidified.

The laser sintering or laser melting apparatus 1 further contains a storage container 14 for a building material 15 in powder form which can be solidified by electromagnetic radiation and a recoating device 16 movable in a horizontal direction H for applying layers of the building material 15 to a build area 8 in the working plane 7. The wall 4 of the process chamber 3 contains at its upper side a coupling window 25 for coupling in the radiation, which serves to solidify the building material 15, into the process chamber 3.

The laser sintering or laser melting apparatus 1 further contains a solidification device 20 having a laser as irradiation device 21. The laser generates a laser beam 22 which is deflected via a deflecting device 23 and focused by a focusing device 24 via the coupling window 25 onto the build area 8 in the working plane 7.

The laser sintering or laser melting apparatus 1 further contains a control device 29 via which the individual component parts of the apparatus 1 are controlled in a coordinated manner for performing the building process. The control device 29 may contain a CPU whose operation is controlled by a computer program (software).

Figure 2:
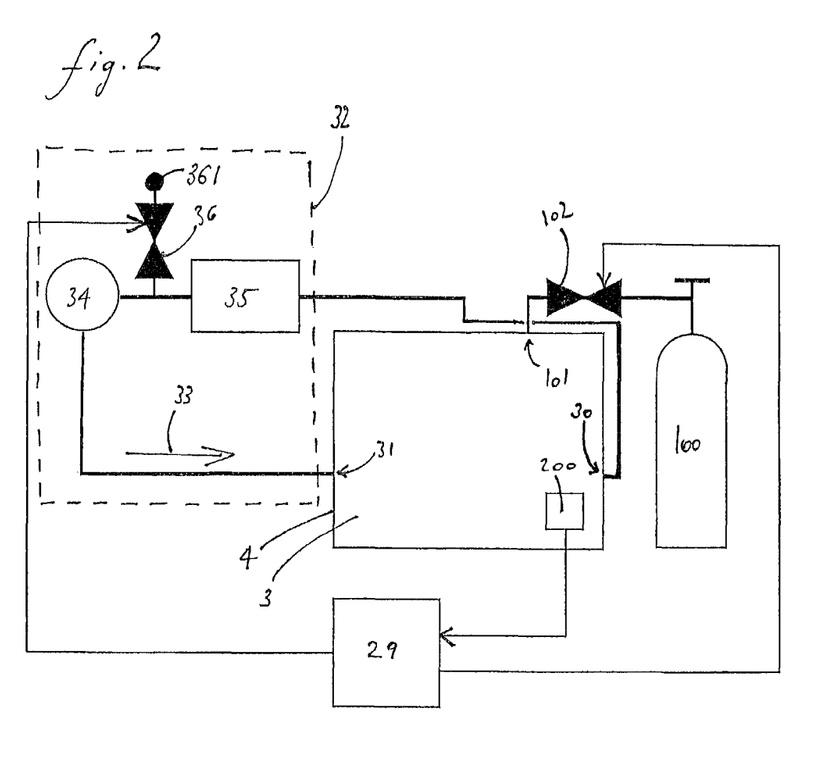
FIG. 2 is a schematic diagram of an apparatus for a layer-by-layer manufacturing of a three-dimensional object according to a first concretized example of an embodiment of the present invention.

As shown in FIG. 2, the process chamber 3 is connected to a gas supply device 100 via an opening 101. The gas supply device 100 is, for instance, a container for compressed gas. For varying the flow rate through the line via which the process chamber 3 and the gas supply device 100 are connected to each other, a gas supply adjustment device 102 is provided. The gas supply adjustment device 102 is, for instance, a continuously adjustable valve, in particular, a proportional or servo valve.

The process chamber 3 is connected to a recirculating air filter device 32 via openings 30, 31, wherein gas gets out of the process chamber 3 into the recirculating air filter device 32 through the opening 30, and gas gets out of the recirculating air filter device 32 into the process chamber 3 through the opening 31. There may also be provided several openings 30 and/or 31.

In FIGS. 2 to 5, the solidification device and the component parts of the apparatus 1 arranged inside the process chamber 3, with the exception of the pressure measuring device 200, are not depicted for the sake of clarity.

Figure 3:
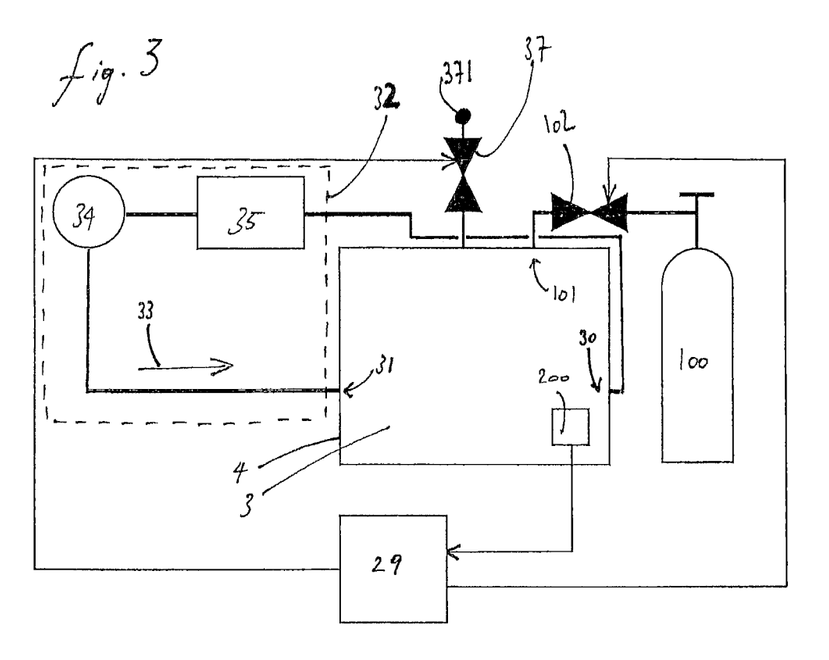
FIG. 3 is a schematic diagram of an apparatus for a layer-by-layer manufacturing of a three-dimensional object according to a second concretized example of an embodiment of the present invention.
Figure 4:
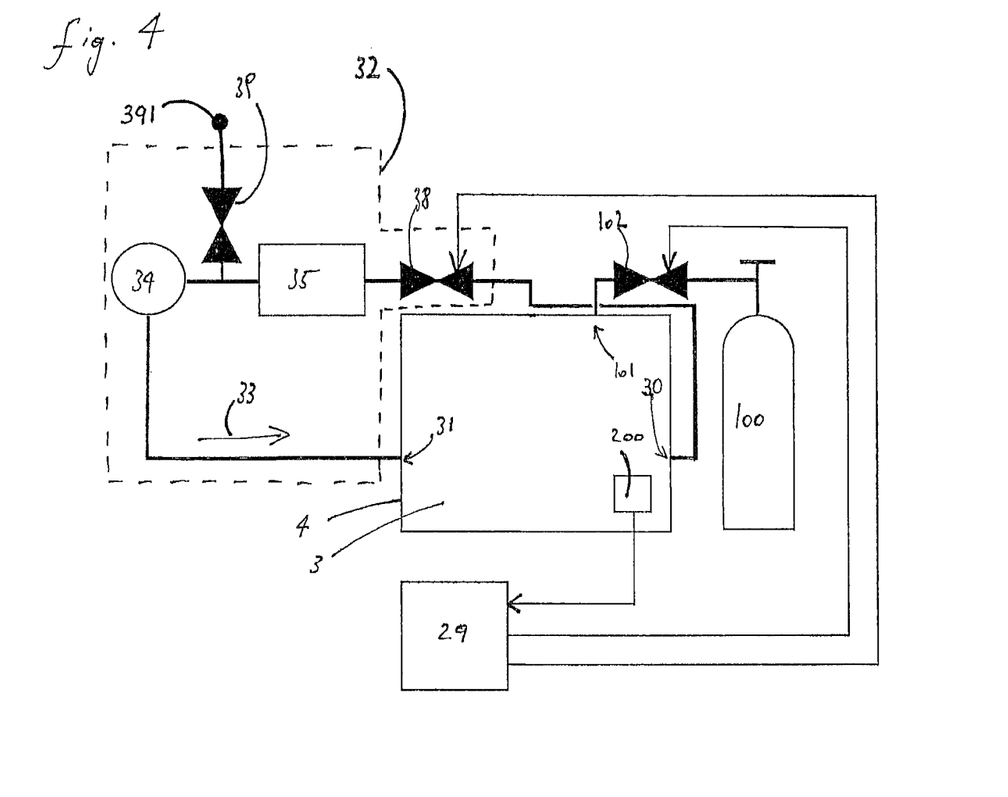
FIG. 4 is a schematic diagram of an apparatus for a layer-by-layer manufacturing of a three-dimensional object according to a third concretized example of an embodiment of the present invention.

The direction in which the gas withdrawn from the process chamber 3 flows through the recirculating air filter device 32 (gas flow direction) is indicated in the FIGS. 2 to 4 by an arrow 33. The gas is pumped through the recirculating air filter device 32 in this direction by a pump device 34. In the course of this, the gas flows through at least one filter device 35.

In the process chamber 3, at least one pressure measuring device 200 for measuring the pressure in the process chamber 3 is arranged. The pressure measuring device can be, for instance, a piezoresistive pressure sensor, a capacitive pressure sensor, or an inductive pressure sensor. It is possible that, for instance, as a consequence of the flow of gas through the process chamber 3, the pressure is not the same at all points in the process chamber 3, a slightly inhomogeneous pressure distribution then exists in the process chamber 3.

The term "keeping the pressure in the process chamber substantially constant" is understood to mean affecting the pressure distribution in at least one region of the process chamber 3 such that it stays substantially unchanged over time. In the course of this, the pressure varies in this region preferably by not more than ±5 mbar, more preferably by ±2 mbar, still more preferably by ±1 mbar. The term "keeping the pressure in the process chamber substantially constant" is also understood to mean affecting the pressure distribution in at least one region of the process chamber 3 such that after an abrupt change of the pressure conditions in the process chamber 3 the pressure distribution that had existed before the change is substantially reestablished at least in this region. In the course of this, the pressure before the abrupt change and after the re-establishing differ preferably by not more than ±5 mbar, more preferably by ±2 mbar, still more preferably by ±1 mbar.

The laser sintering or laser melting apparatus 1 also comprises a pressure stabilization device. In FIG. 2, the pressure stabilization device is a gas outlet adjustment device 36 for varying the amount of gas streaming out of the apparatus through a gas outlet 361 per unit of time. In the course of this, the gas outlet 361 is provided behind the filter device 35 and in front of the pump device 34 in gas flow direction. The gas outlet adjustment device 36 is, for instance, a continuously adjustable valve, in particular, a proportional or servo valve.

The control device 29 is configured to vary the amount of gas streaming out of the apparatus 1 through the gas outlet 361 per unit of time such that the pressure in the process chamber 3 stays substantially constant. To this end, the pressure in the process chamber 3 is measured by means of a pressure measuring device 200 and the actual value thus obtained is compared by the control device 29 with a predetermined desired value. If a deviation between actual value and desired value is greater than a predetermined maximum permissible deviation, the gas outlet adjustment device 36 is adjusted by the control device such that the actual value of the pressure in the process chamber 3 is brought into line with the desired value. Such a maximum permissible deviation defines (also in the following) the width of the stabilization of the (operating) pressure in the process chamber 3.

FIG. 3 shows an example of an embodiment of the apparatus 1 according to the invention comprising, as a pressure stabilization device, a gas outlet adjustment device 37 for varying the amount of gas streaming out of the apparatus 1 through a gas outlet 371 per unit of time. In the course of this, the gas outlet 371 is mounted at the process chamber 3. The gas outlet adjustment device 37 is, for instance, a continuously adjustable valve, in particular, a proportional or servo valve.

The control device 29 is configured to vary the amount of gas streaming out of the apparatus 1 through the gas outlet 371 per unit of time by means of the gas outlet adjustment device 37 such that the pressure in the process chamber 3 measured by means of a pressure measuring device 200 stays substantially constant. To this end, the pressure in the process chamber 3 is measured by means of a pressure measuring device 200 and the actual value thus obtained is compared by the control device 29 with a predetermined desired value. If a deviation between actual value and desired value is greater than a predetermined maximum permissible deviation, the gas outlet adjustment device 37 is adjusted by the control device such that the actual value of the pressure in the process chamber 3 is brought into line with the desired value.

FIG. 4 shows an example of an embodiment of the apparatus 1 according to the invention comprising, as a pressure stabilization device, a gas flow rate adjustment device 38 for varying the flow resistance of the recirculating air filter device 32. The gas flow rate adjustment device 38 is, for instance, a throttle valve or a continuously adjustable valve, in particular, a proportional or servo valve.

The control device 29 is configured to vary the flow resistance of the recirculating air filter device 32 by means of the gas flow rate adjustment device 38 such that the pressure in the process chamber 3 measured by means of a pressure measuring device 200 stays substantially constant. To this end, the pressure in the process chamber 3 is measured by means of a pressure measuring device 200 and the actual value thus obtained is compared by the control device 29 with a predetermined desired value. If a deviation between actual value and desired value is greater than a predetermined maximum permissible deviation, the gas flow rate adjustment device 38 is varied by the control device such that the actual value of the pressure in the process chamber 3 is brought into line with the desired value.

Within the scope of the invention it is possible that the control device 29 is configured such that it varies the amount of gas (different from oxygen) getting from the gas supply device 100 per unit of time into the process chamber 3 by means of the gas supply adjustment device 102 such that the oxygen concentration in the process chamber 3 does not exceed a predetermined threshold value. To this end, the oxygen concentration in the process chamber 3 is measured by means of an oxygen measuring device (not depicted in the Figures) and the actual value thus obtained is compared by the control device 29 with the predetermined threshold value. If the threshold value is exceeded, the gas supply adjustment device 102 is varied by the control device 29 such that the actual value of the oxygen concentration is lower than the threshold value. The oxygen measuring device is, for instance, an amperometric oxygen sensor.

Within the scope of the invention it is also possible to adjust the gas supply adjustment device 102 such that a substantially constant amount of gas gets into the process chamber 3 from the gas supply device 100 per unit of time.

Finally, it is also possible within the scope of the invention to configure the control device 29 such that the amount of gas getting into the process chamber 3 from the gas supply device 100 per unit of time is varied by means of the gas supply adjustment device 102 such that the pressure in the process chamber 3 is substantially constant. To this end, the pressure in the process chamber 3 is measured by means of a pressure measuring device 200 and the actual value thus obtained is compared by the control device 29 with a predetermined desired value. If a deviation between actual value and desired value is greater than a predetermined maximum permissible deviation, the gas supply adjustment device 102 is varied by the control device such that the actual value of the pressure in the process chamber 3 is brought into line with the desired value. In this sense, the gas supply adjustment device 102 can also be a part of the pressure stabilization device or, respectively, constitute the same.

The apparatus 1 according to the invention according to the example of the embodiment shown in FIG. 4 comprises a gas outlet 391 provided in the recirculating air filter device 32 between the filter device 35 and the pump device 34. Optionally, a gas outlet adjustment device 39 is provided for varying the amount of gas streaming out of the apparatus 1 through this gas outlet 391 per unit of time. The gas outlet adjustment device 39 is, for instance, a continuously adjustable valve, in particular, a proportional or servo valve.

Figure 5:
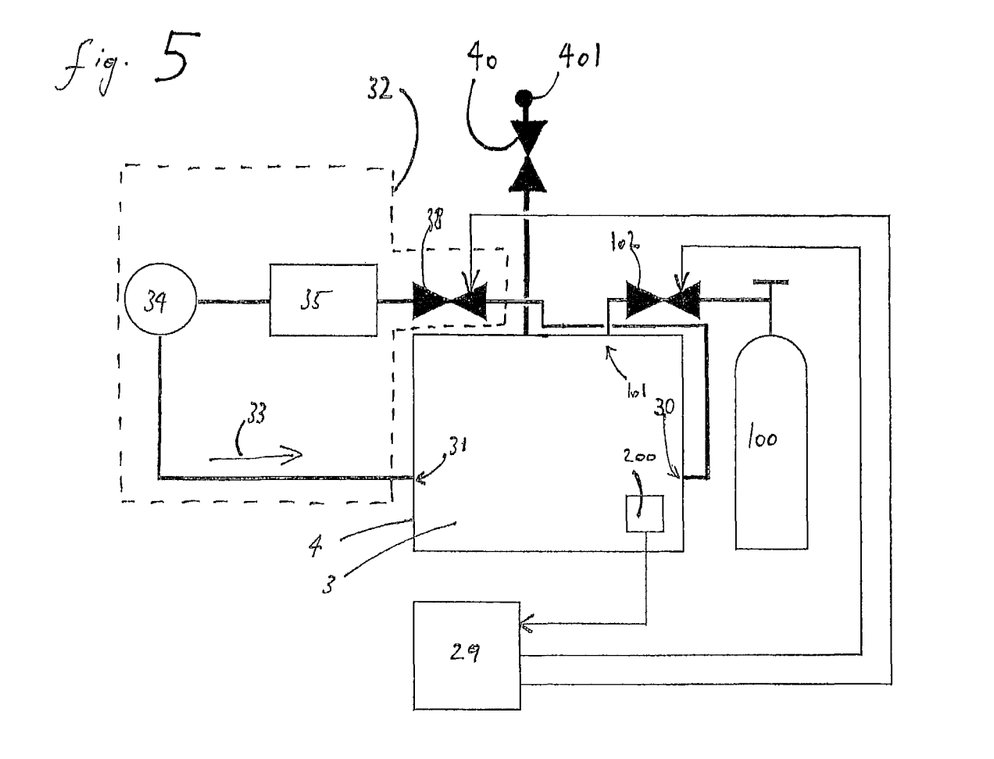
FIG. 5 is a schematic diagram of an apparatus for a layer-by-layer manufacturing of a three-dimensional object according to a fourth concretized example of an embodiment of the present invention.

In FIG. 5, an example of an embodiment of the apparatus according to the invention is shown. In this example of an embodiment being, apart from this, analogue to the example of an embodiment shown in FIG. 4, the gas outlet 401 is provided not between filter device 35 and pump device 34, but at the process chamber 3. Optionally, a gas outlet adjustment device 40 is provided for varying the amount of gas streaming out of the apparatus 1 through this gas outlet 401 per unit of time. The gas outlet adjustment device 40 is, for instance, a continuously adjustable valve, in particular, a proportional or servo valve.

During operation of the laser sintering or laser melting apparatus 1, first, the support 10 is lowered for applying a layer of the building material 15 in powder form by a height preferably corresponding to the desired layer thickness. By using the recoating device 16, a layer of the building material 15 in powder form is then applied. The application is carried out at least across the total cross-section of the object 2 to be manufactured, preferably, across the whole build area 8. Subsequently, the cross-section of the object 2 to be manufactured is scanned by the laser beam 22, so that the building material 15 in powder form is solidified at these points. The steps are repeated as long as until the object 2 is completed and can be removed from the container 5.

While manufacturing the object 2, gas is supplied to the process chamber 3 and gas is discharged from the process chamber 3. To this end, the process chamber 3 is connected to a recirculating air filter device 32 via openings 30, 31, wherein gas gets out of the process chamber 3 into the recirculating air filter device 32 through the opening 30, and gets out of the recirculating air filter device 32 into the process chamber 3 through the opening 31. Additionally, gas is supplied to the apparatus 1 at least temporarily from a gas supply device 100. Besides, gas streams at least temporarily out of the apparatus 1 through a gas outlet (361, 371, 391, 401).

In the course of this, it is advantageous if in the region of the process chamber 3 lying above the build area 8 a preferably laminar gas stream is formed, in order to effectively remove splashes, smoke, condensates, as well as other released substances from this region.

As gas, in general, a protective gas is selected, i.e. a gas which is substantially inert to the building material at the conditions prevailing during the manufacturing of an object 2. As protective gas, for instance, a noble gas (Helium, Neon, Argon, Krypton, Xenon) or nitrogen can be used. It is also possible to use hydrogen or any other reducing gas or to use (cleaned and/or dried) air or any other oxidizing gas. Mixtures of different gases can also be used.

Gas is withdrawn from a gas supply device 100 and is supplied to the apparatus 1 via an opening 101, which is, for instance, mounted at the wall 4 of the process chamber 3. In the course of this, the supply of gas can be carried out continuously. Within the scope of the invention it is possible to control the amount of the gas withdrawn from the gas supply device 100 and supplied to the apparatus 1 per unit of time such that the oxygen concentration in the process chamber 3 does not exceed a predetermined threshold value, for instance, 0.1 volume percent if Argon is used as protective gas. To this end, the oxygen concentration in the process chamber 3 is, for instance, measured by an amperometric technique. Per unit of time, an amount of gas is circulated in closed circuit by the recirculating air filter device 32 which is greater, preferably more than ten times greater, particularly preferably more than hundred times greater, quite particularly preferably more than five hundred times greater than the amount of the gas supplied from the gas supply device 100 to the apparatus 1 per unit of time.

During operation, substances to be separated from the gas pumped through the recirculating air filter device 32 deposit in the filter device 35. Thereby, the filter device 35 becomes soiled and the flow resistance of the filter device 35 gradually increases. Thus, from time to time, the filter device 35 is cleaned. This is preferably carried out by means of a gas pressure shock which is guided through the filter device 35 in the direction opposite to the gas flow direction. Within the scope of the invention, a cleaning of the filter device 35 by vibrating and/or scraping is also possible. If the filter device 35 comprises several filters consecutively arranged in gas flow direction, at least one of these filters is cleaned for cleaning the filter device 35, preferably, all filters are cleaned for cleaning the filter device 35. As a consequence of cleaning the filter device 35, the flow resistance of the filter device 35 decreases.

The pressure in the process chamber 3 is measured by means of a pressure measuring device 200. In the course of this, the pressure measuring device 200 provides a signal depending on the pressure in the process chamber 3 to the control device 29. In the course of this, the pressure in the process chamber 3 is controlled such that it is substantially constant independently of the flow resistance of the filter device 35, i.e. lies in a range around a predetermined desired value, wherein this range is preferably desired value ±5 mbar, more preferably desired value ±2 mbar, still more preferably desired value ±1 mbar.

It is advantageous to operate the laser sintering or laser melting apparatus 1 such that in the process chamber 3 and in all parts of the recirculating air filter device 32 as well as in all lines between the process chamber 3 and the recirculating air filter device 32 a pressure prevails which is greater that the ambient pressure. Such an overpressure prevents entering of ambient air into the apparatus 1 through leakages. It is, in general, not wanted that air enters the apparatus 1 since disturbing gases, for instance, oxygen, carbon dioxide, or water vapor get into the inside of the apparatus 1 in a respectively too high amount with the air from the environment.

During operation of a laser sintering or laser melting apparatus 1 according to the example of the embodiment shown in FIG. 2, the control device 29 varies by means of the gas outlet adjustment device 36 the amount of gas discharged to the environment through a gas outlet 361 per unit of time such that the pressure in the process chamber 3 is substantially constant.

In the course of this, in a concrete embodiment of the invention, Argon is used as gas. While, for instance, ca. 5 $m^3$ gas is circulated in closed circuit through the recirculating air filter device 32 per minute, the amount of gas supplied per minute to the process chamber 3 via an opening 101 in the process chamber wall 4 from, for instance, an Argon gas bottle serving as gas supply device 100 lies, for instance, between 1 $dm^3$ and 10 $dm^3$. (Data for gas volumes relate to a pressure of 1 bar.) Thereby, for instance, during the manufacturing of an object 2, an overpressure between a minimum value of 28 mbar and a maximum value of 32 mbar relatively to the ambient pressure can be maintained in the process chamber 3. In the course of this, the manufacturing of an object 2 is interrupted during and after cleaning the filter unit 35 by means of a gas pressure shock, until the pressure in the process chamber 3 has reached a value between the minimum value and the maximum value again.

During operation of a laser sintering or laser melting apparatus 1 according to the example of the embodiment shown in FIG. 3, the control device 29 varies by means of the gas outlet adjustment device 37 the amount of gas discharged to the environment through a gas outlet 371 per unit of time such that the pressure in the process chamber 3 is substantially constant.

During operation of a laser sintering or laser melting apparatus 1 according to the example of the embodiment shown in FIG. 4 or FIG. 5, the control device 29 varies the flow resistance of the recirculating air filter device 32 by means of the gas flow rate adjustment device 38 such that the pressure in the process chamber 3 is substantially constant independently of the flow resistance of the recirculating air filter device 32. In the course of this, the amount of the gas discharged per unit of time through the gas outlet adjustment device 39, 40 is kept substantially constant.

In order to keep the pressure in the process chamber 3 substantially constant, it is considered within the scope of the invention that the pressure stabilization device consists of one or several of the following elements: gas supply adjustment device 102, gas outlet adjustment device 36, gas outlet adjustment device 37, gas flow rate adjustment device 38, and gas outlet adjustment device 39. This means that the pressure stabilization device can be realized practically arbitrarily also by other combinations of these mentioned elements within the scope of the invention, except these combinations are logically excluded, and that also elements mentioned based on the above-described four concretized examples of embodiments can be analogously arbitrarily replaced by others of the mentioned elements. The four concretized examples of embodiments are understood as particularly advantageous with reference to the above explanations.

Even though the present invention has been described on the basis of a laser sintering or laser melting apparatus 1, it is not limited to the laser sintering or laser melting. It may be applied to arbitrary methods of manufacturing a three-dimensional object by a layer-by-layer application and selective solidification of a building material 15. In the course of this, the building material can be in powder form, as is the case, for instance, with the laser sintering or laser melting.

As building material 15 in powder form, various kinds of powder may be used, in particular, metal powder, plastic powder, ceramic powder, sand, filled or mixed powders. However, the building material 15 can also be liquid, as is the case, for instance, with the methods known as "stereolithography".

The solidification device 20 can, for instance, comprise one or more gas or solid state lasers or any other type of lasers, such as e.g. laser diodes, in particular VCSEL (Vertical Cavity Surface Emitting Laser), or VECSEL (Vertical External Cavity Surface Emitting Laser), or a line of these lasers. Generally, any device by means of which energy can be selectively applied to a layer of the building material as wave or particle radiation may be used as irradiation device 20. Instead of a laser, for instance, also other light sources, electron beam sources, or any other energy or, respectively, radiation source may be used which is suitable for solidifying the building material. In particular, the irradiating may also be performed using a movable line irradiator. The invention may also be applied to the selective mask sintering, where an extended light source and a mask are used, or to the High-Speed-Sintering (HSS), where a material enhancing (absorption sintering) or reducing (inhibition sintering) the absorption of radiation at the points corresponding to the object cross-section is selectively applied onto the building material, and then an irradiation is performed non-selectively in a large-area manner or using a movable line irradiator.

The invention claimed is:

1. An apparatus for manufacturing a three-dimensional object by a layer-by-layer solidification of a building material at points corresponding to the cross-section of the object to be manufactured in a respective layer, comprising:
a process chamber in which the object is built up layer-by-layer in a build process by selectively solidifying layers of the building material in a build area, wherein the process chamber is closed to ambient air when in use;
a gas supply device including a gas supply valve that is operable over a range of gas flow supply;
a recirculating gas circuit including a process chamber outlet for gas contained within the process chamber, a process chamber inlet to the process chamber for a recirculated gas return to the process chamber, a recirculating filter device that filters gas drawn from the process chamber, a recirculating gas valve that is operable over a range of gas flow rates, a recirculating gas pump, and conduit elements communicating gas from the process chamber outlet through the recirculating filter device and back into the process chamber through the process chamber inlet; and
a process chamber pressure stabilization device that is operated to maintain process chamber pressure in the process chamber at a set level throughout the entire build process,
wherein the controller operates the gas supply valve and the recirculating gas valve to balance the gas supply and the recirculating gas to vary the process chamber pressure after a cleaning of the recirculating filter device while the recirculating filter device is connected to the recirculating gas circuit such that the process chamber pressure returns to the set level, wherein the process chamber pressure stabilization device varies the process chamber pressure such that it returns to the set level within 10 seconds after the cleaning of the recirculating filter device.

2. The apparatus according to claim 1, further comprising a solidification device for solidifying the building material in the respective layer at positions in the build area which correspond to the cross-section of the object, the solidification device comprising an irradiation device for emitting laser radiation, and/or for emitting particle radiation to positions in the build area which correspond to the cross-section of the object in the respective layer of the building material.

3. The apparatus according to claim 1, further comprising a recoating device to apply the building material in a powder form over the build area to provide a respective layer.

4. The apparatus according to claim 1, wherein the process chamber pressure stabilization device comprises a gas supply adjustment device for continuously varying an amount of gas streaming into the process chamber from the gas supply device per unit of time.

5. The apparatus according to claim 1, wherein the process chamber pressure stabilization device comprises a gas outlet adjustment device for varying an amount of gas streaming out of the apparatus through a gas outlet per unit of time.

6. The apparatus according to claim 1, further comprising a gas outlet mounted to the process chamber.

7. The apparatus according to claim 1, further comprising a gas outlet arranged downstream of the recirculating filter device in a flow direction of the gas.

8. The apparatus according to claim 1, wherein the process chamber pressure stabilization device comprises a gas flow rate adjustment device having a variable flow resistance.

9. The apparatus according to claim 8, wherein the gas flow rate adjustment device is arranged downstream of the recirculating filter device, in a flow direction of the gas.

10. The apparatus according to claim 1, wherein the pressure measuring device for measuring the pressure is located in the process chamber.

11. The apparatus according to claim 1, wherein the apparatus comprises a control device varying an amount of gas streaming into the process chamber from the gas supply device per unit of time and/or an amount of gas streaming out of the apparatus per unit of time and/or a flow resistance of a gas flow rate adjustment device using the process pressure stabilization device such that the set level of the process chamber pressure is maintained.

12. The apparatus according to claim 1, wherein the at least one recirculating filter device is cleanable by a gas pressure shock opposing a gas flow direction.

13. The apparatus according to claim 1, wherein the recirculating gas valve varies the amount of gas streaming out of the apparatus through a gas outlet per unit of time.

14. The apparatus according to claim 1, wherein the recirculating gas valve has a variable flow resistance.

15. The apparatus according to claim 14, wherein the recirculating gas valve is arranged downstream of the recirculating filter device, in a flow direction of the gas.

16. An apparatus for manufacturing a three-dimensional object by a layer-by-layer solidification of a building material at points corresponding to the cross-section of the object to be manufactured in a respective layer, comprising:
- a process chamber in which the object is to be built up layer-by-layer in a build process by selectively solidifying layers of the building material in a build area, wherein the process chamber is closed to ambient air in use;
- a gas supply device including a gas supply valve that is operable over a range of gas flow supply;
- a recirculating gas circuit including a process chamber outlet for gas contained within the process chamber, a process chamber inlet to the process chamber for a recirculated gas return to the process chamber, and a recirculating filter device that filters gas drawn from the process chamber;
- a recirculating gas valve that is operable over a range of gas flow rates, a recirculating gas pump, and conduit elements communicating gas from the process chamber outlet through the recirculating filter device and back into the process chamber through the process chamber inlet; and
- a process chamber pressure stabilization device that is operated to maintain process chamber pressure in the process chamber at a set level throughout the build process,
- wherein the controller operates the gas supply valve and the recirculating gas valve to balance the gas supply and the recirculating gas to vary the process chamber pressure after a cleaning of the recirculating filter device while the recirculating filter device is connected to the recirculating gas circuit such that the process chamber pressure returns to a pressure not differing by more than ±5 mbar from the process chamber pressure before the cleaning, wherein the process chamber pressure stabilization device varies the process chamber pressure such that it returns to the set level within 10 seconds after the cleaning of the recirculating filter device.

17. A method of manufacturing a three-dimensional object by a layer-by-layer solidification of a building material at points corresponding to the cross-section of the object to be manufactured in a respective layer in an apparatus, the method comprising:
- providing a process chamber having an interior within which the object is built up layer-by-layer in a build process by selectively solidifying layers of the building material in a build area, wherein components are located within the process chamber constituting physical build parts forming elements of the apparatus used within the process chamber in the build process, the components including a recoater and a support movable in a vertical direction, the components having a construction that can be changed in shape or that can be moved in position within the process chamber by pressure variations within the process chamber during the build process;
- closing the process chamber to ambient air during use;
- providing a gas supply communicating with the process chamber interior, wherein the gas supply includes a gas supply valve which is operable over a range of gas flow supply;
- providing a recirculating gas circuit including a process chamber outlet for gas contained within the process chamber, a process chamber inlet to the process chamber interior for a recirculated gas return to the process chamber, a recirculating filter device which filters gas drawn from the process chamber, a recirculating gas valve that is operable over a range of gas flow rates, a recirculating gas pump, and conduit elements communicating gas from the process chamber outlet through the recirculating filter device and back into the process chamber through the process chamber inlet;
- cleaning the recirculating filter device while the recirculating filter device is connected to the recirculating gas circuit; and
- operating a process chamber pressure stabilization device to maintain process chamber pressure in the process chamber at a set level throughout the build process, wherein the process chamber pressure stabilization device includes a controller that is operated to adjust the gas supply valve and the recirculating gas valve using a pressure measuring device monitoring pressure within the process chamber, and wherein the controller operates the gas supply valve and the recirculating gas valve to balance the gas supply and the recirculating gas to vary the process chamber pressure after the cleaning of the filter device such that the process chamber pressure returns to the set level, chamber outlet through the recirculating filter device and back into the process chamber through the process chamber inlet;
- cleaning the recirculating filter device; and
- operating a process chamber pressure stabilization device to maintain process chamber pressure in the process chamber at a set level throughout the build process, wherein the process chamber pressure stabilization device includes a controller that is operated to adjust the gas supply valve and the recirculating gas valve using a pressure measuring device monitoring pressure within the process chamber, and wherein the controller operates the gas supply valve and the recirculating gas valve to balance the gas supply and the recirculating gas to vary the process chamber pressure after a cleaning of the filter device such that the process chamber pressure returns to the set level.

18. A method of manufacturing a three-dimensional object by a layer-by-layer solidification of a building material at points corresponding to the cross-section of the object to be manufactured in a respective layer in an apparatus, the method comprising:
- providing a process chamber having an interior within which the object is built up layer-by-layer in a build process by selectively solidifying layers of the building material in a build area;
- closing the process chamber to ambient air during use;
- providing a gas supply communicating with the process chamber interior, wherein the gas supply includes a gas supply valve which is operable over a range of gas flow supply;
- providing a recirculating gas circuit including a process chamber outlet for gas contained within the process chamber, a process chamber inlet to the process chamber interior for a recirculated gas return to the process chamber, a recirculating filter device which filters gas drawn from the process chamber, a recirculating gas valve that is operable over a range of gas flow rates, a recirculating gas pump, and conduit elements communicating gas from the process chamber outlet through the recirculating filter device and back into the process chamber through the process chamber inlet, cleaning the recirculating filter device while the recirculating filter device is connected to the recirculating gas circuit; and operating a process chamber pressure stabilization device to maintain process chamber pressure in the process chamber at a set level throughout the build process, wherein the process chamber pressure stabilization device includes a controller that is operated to adjust the gas supply valve and the recirculating gas valve using a pressure measuring device monitoring pressure within the process chamber, and wherein the controller operates the gas supply valve and the recirculating gas valve to balance the gas supply and the recirculating gas to vary the process chamber pressure after the cleaning of the filter device such that the process chamber pressure returns a pressure not differing by more than ±5 mbar from the process chamber pressure before the cleaning, wherein the process chamber pressure stabilization device varies the process chamber pressure such that it returns to the set level within 10 seconds after the cleaning of the recirculating filter device.

19. A method of manufacturing a three-dimensional object by a layer-by-layer solidification of a building material at points corresponding to the cross-section of the object to be manufactured in a respective layer in an apparatus, the method comprising:

providing a process chamber having an interior within which the object is built up layer-by-layer in a build process by selectively solidifying layers of the building material in a build area;

closing the process chamber to ambient air during use;

providing a gas supply communicating with the process chamber interior, wherein the gas supply includes a gas supply valve which is operable over a range of gas flow supply;

providing a recirculating gas circuit including a process chamber outlet for gas contained within the process chamber, a process chamber inlet to the process chamber interior for a recirculated gas return to the process chamber, a recirculating filter device which filters gas drawn from the process chamber, a recirculating gas valve that is operable over a range of gas flow rates, a recirculating gas pump, and conduit elements communicating gas from the process chamber outlet through the recirculating filter device and back into the process chamber through the process chamber inlet, with a gas outlet arranged downstream of the recirculating filter device in a flow direction of the gas and a gas flow rate adjustment device arranged downstream of the recirculating filter device, in the flow direction of the gas;

cleaning the recirculating filter device while the recirculating filter device is connected to the recirculating gas circuit; and operating a process chamber pressure stabilization device to maintain process chamber pressure in the process chamber at a set level throughout the build process, wherein the process chamber pressure stabilization device includes a controller that is operated to adjust the gas supply valve and the recirculating gas valve using a pressure measuring device monitoring pressure within the process chamber, and wherein the controller operates the gas supply valve and the recirculating gas valve to balance the gas supply and the recirculating gas to vary the process chamber pressure after the cleaning of the filter device such that the process chamber pressure returns a pressure not differing by more than ±5 mbar from the process chamber pressure before the cleaning and wherein the process chamber pressure stabilization device varies the process chamber pressure such that the process chamber pressure returns to the set level within 10 seconds after the cleaning of the recirculating filter device, the process chamber pressure stabilization device comprising a gas supply adjustment device for continuously varying an amount of gas streaming into the process chamber from the gas supply device per unit of time and a gas outlet adjustment device for varying an amount of gas streaming out of the apparatus through a gas outlet per unit of time and further including that the gas flow rate adjustment device has a variable flow resistance;

providing a solidification device for solidifying the building material in the respective layer at positions in the build area which correspond to the cross-section of the object, the solidification device having an irradiation device for emitting laser radiation, and/or for emitting particle radiation to positions in the build area which correspond to the cross-section of the object in the respective layer of the building material; and providing a recoating device to apply the building material in a powder form over the build area to provide the respective layer.

20. A method of manufacturing a three-dimensional object by a layer-by-layer solidification of a building material at points corresponding to the cross-section of the object to be manufactured in a respective layer in an apparatus, the method comprising:

providing a process chamber having an interior within which the object is built up layer-by-layer in a build process by selectively solidifying layers of the building material in a build area, wherein components are located within the process chamber constituting physical build parts forming elements of the apparatus used within the process chamber in the build process, the components including a recoater and a support movable in a vertical direction, the components having a construction that can be changed in shape or that can be moved in position within the process chamber by pressure variations within the process chamber during the build process;

closing the process chamber to ambient air during use;

providing a gas supply communicating with the process chamber interior, wherein the gas supply includes a gas supply valve which is operable over a range of gas flow supply;

providing a recirculating gas circuit including a process chamber outlet for gas contained within the process chamber, a process chamber inlet to the process chamber interior for a recirculated gas return to the process chamber, a recirculating filter device which filters gas drawn from the process chamber, the recirculating filter device being subject to increasing flow resistance through build up of filtered material occurring during use, a recirculating gas valve that is operable over a range of gas flow rates, a recirculating gas pump, and conduit elements communicating gas from the process chamber outlet through the recirculating filter device and back into the process chamber through the process chamber inlet;

operating a process chamber pressure stabilization device to maintain process chamber pressure in the process chamber at a set level throughout the build process, wherein the process chamber pressure stabilization device includes a controller that is operated to adjust the gas supply valve and the recirculating gas valve using a pressure measuring device monitoring pressure within the process chamber, and wherein the controller operates the gas supply valve and the recirculating gas valve to balance the gas supply and the recirculating gas such that the process chamber pressure is substantially constant throughout the build process; and cleaning the recirculating filter device in the build process while the recirculating filter device is connected to the recirculating gas circuit, wherein the process chamber pressure returns to the set level within about 10 seconds after the cleaning of the recirculating filter device.

* * * * *